United States Patent [19]
Artwick

[11] 3,786,880
[45] Jan. 22, 1974

[54] PLATFORM SCALE
[75] Inventor: Kert E. Artwick, Morton Grove, Ill.
[73] Assignee: Hanson Scale Company, Chicago, Ill.
[22] Filed: Oct. 25, 1972
[21] Appl. No.: 300,485

[52] U.S. Cl. .................... 177/1, 177/170, 177/230, 177/243
[51] Int. Cl.. G01g 23/14, G01g 23/26, G01g 21/28
[58] Field of Search ....... 177/170, 1, 225, 229, 230, 177/243; 116/129 R

[56] References Cited
UNITED STATES PATENTS

| 1,572,609 | 2/1926 | Knapp | 177/230 |
| 2,036,636 | 4/1936 | Kingsbury | 177/299 X |
| 2,588,322 | 3/1952 | Herbst | 177/225 X |
| 3,479,591 | 11/1969 | Mathews | 116/129 R X |
| 3,584,696 | 6/1971 | Eblowitz | 177/225 X |

FOREIGN PATENTS OR APPLICATIONS

| 506,941 | 11/1951 | Belgium | 177/229 |

Primary Examiner—George H. Miller, Jr.
Attorney, Agent, or Firm—George R. Clark

[57] ABSTRACT

A versatile scale having an easily changed readout face which due to its resiliency may be flexed to forcibly engage a retaining frame positioned adjacent to the scale mechanism indicator which is located behind the scale readout face and thus need not be removed before changing the scale face. The assembly method of the scale enclosure is designed to require a minimum number of steps and extraneous components since most of the pieces are made such that they snap together. This versatile scale also has an easily interchangeable weight receiving platform such that various arrangements may be used to support or carry the load to be weighed.

19 Claims, 14 Drawing Figures

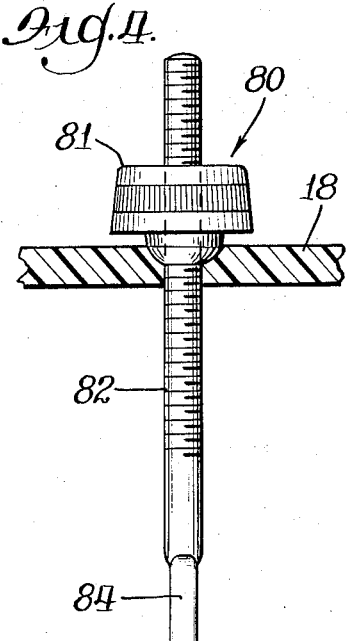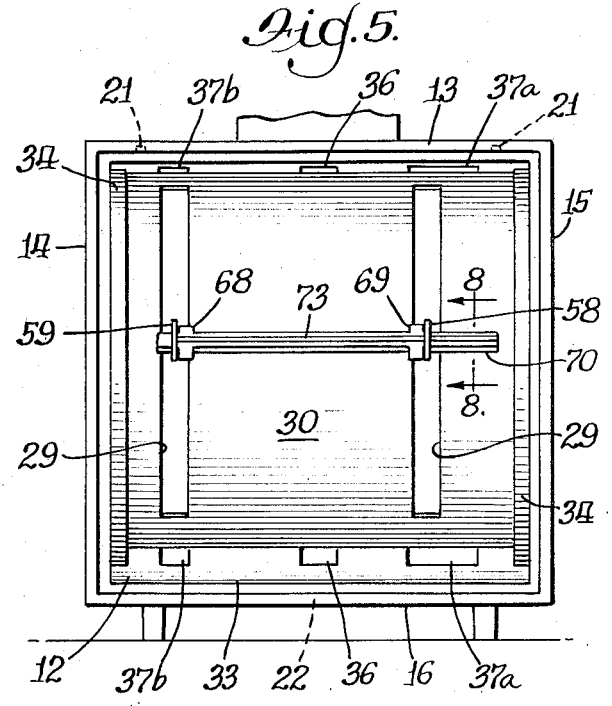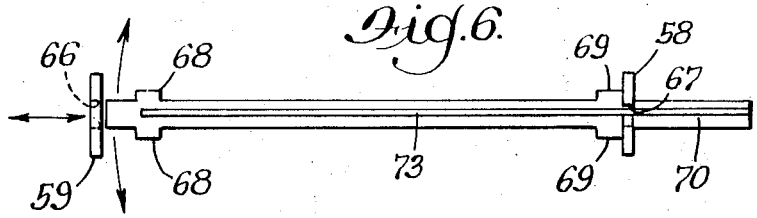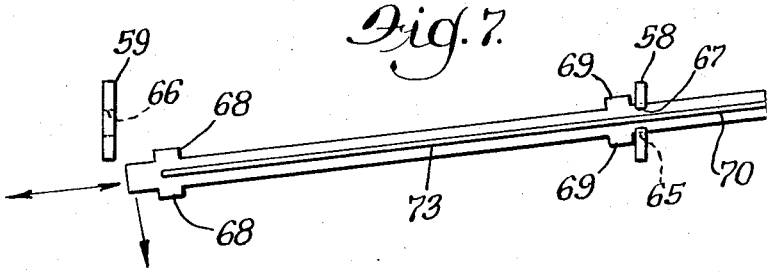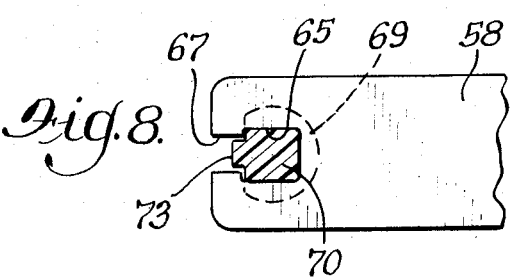

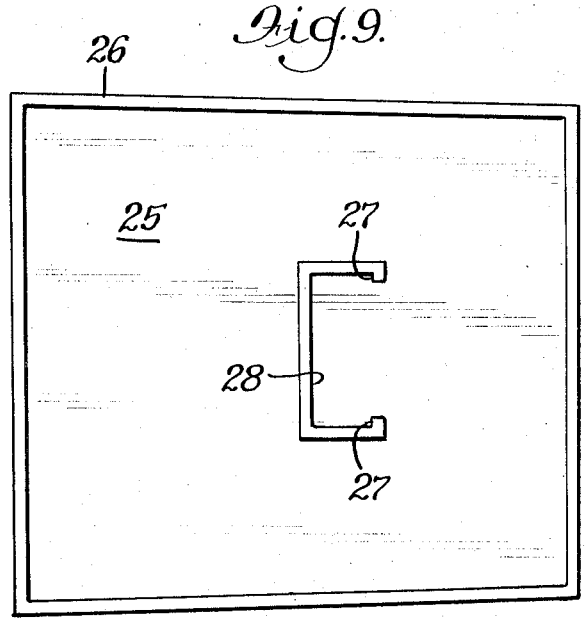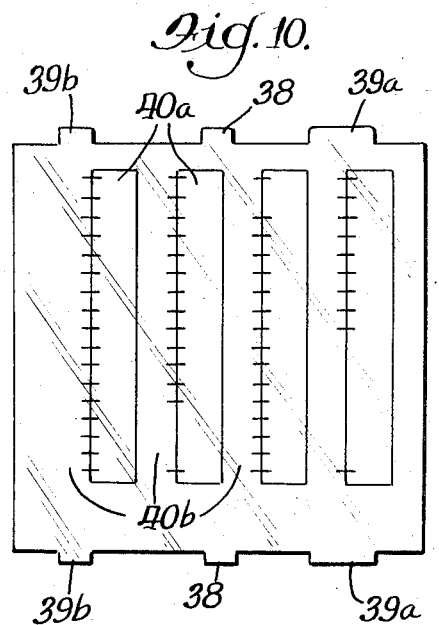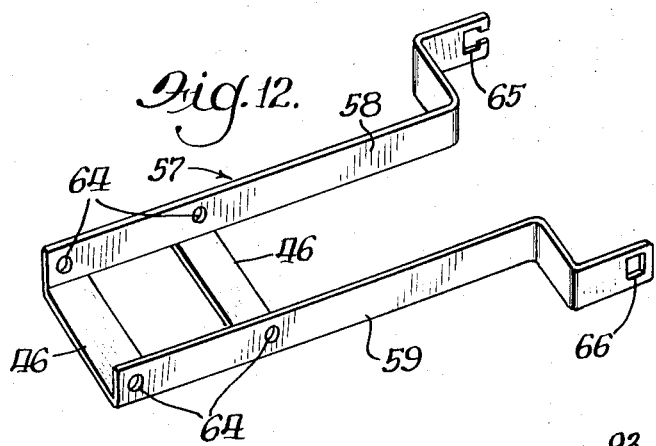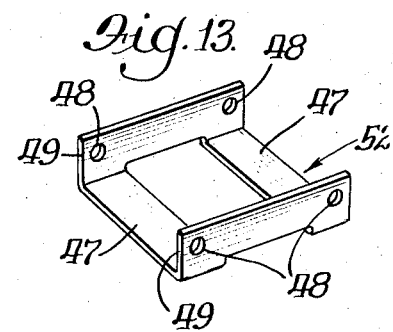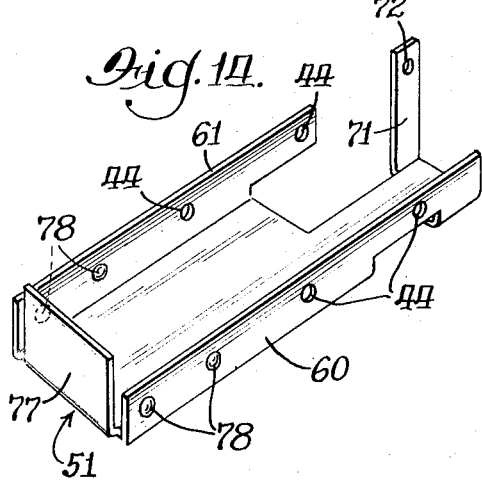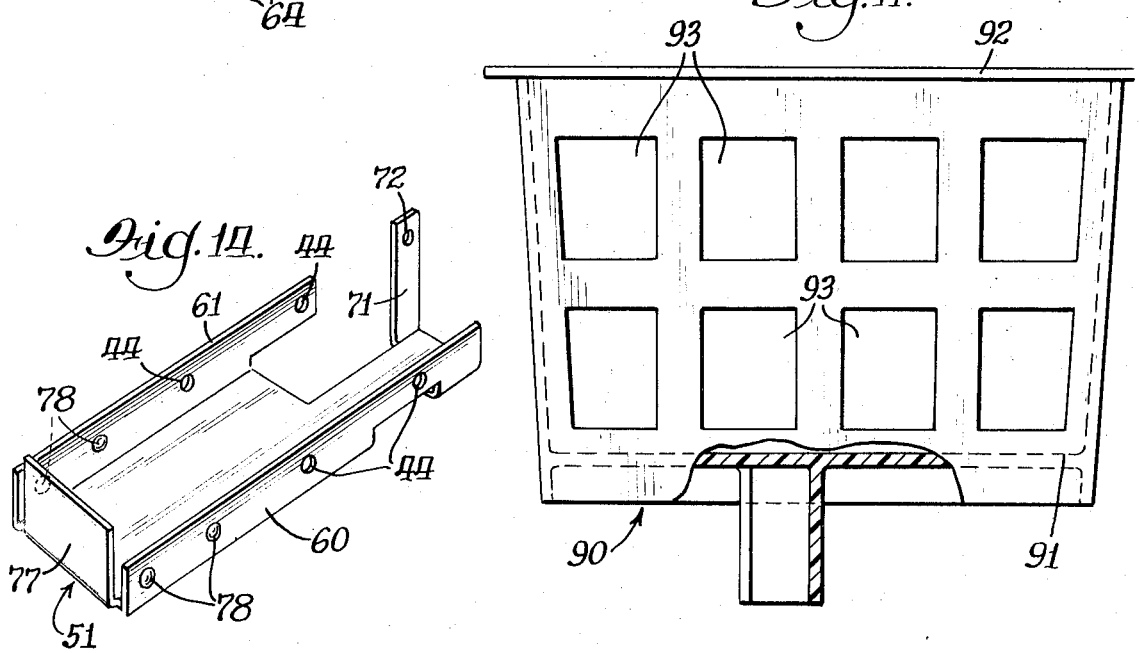

PLATFORM SCALE

BACKGROUND OF THE INVENTION

There are a number of reasons why it becomes desirable to have a scale readout face which may be easily changed and a single scale design which is adaptable to being used for a number of rather specific and particular purposes. It is the general practice of the scale industry to use one scale mechanism in connection with a number of different kinds of scales and weight receiving platforms or receptacles. In order that the appropriate weight measures may be used in connection with the various scale types, a readily changeable calibrated scale readout face and an easily assembled housing are desirable.

In the United States, there is a considerable amount of concern about changing the common ounce/pound weight measurement to the metric system whereby scale readout faces will have to be changed to read in grams and kilograms. As can be appreciated, such a change will require that many of the scales in use should be able to be easily adapted to either system. The convenience with which this change may be accomplished will be an important feature of any present or future scale.

It has also been found that there is presently a tremendous interest in the use of small platform scales for kitchen and gourmet purposes. One of these purposes is commonly referred to as calorie counting. In a scale used for this purpose it has been found that caloric information included on the calibrated readout face is useful in the planning and preparation of dietetic meals. From time to time popular diets change, and because of these fad diets it has become worthwhile to have a calibrated readout face which can be conveniently adapted to reflect the current trends in dietetic cooking. Another and closely associated scale use is in the field of gourmet cooking. It has been found that certain rather intricate recipes have become quite popular and the use of a scale to properly measure the ingredients is required. For this purpose, particular gourmet oriented calibrated readout faces are a worthwhile feature for the preparation of epicurean delights. Similarly, it is also a well known fact that Europeans have their recipes in terms of weight measures for the amount of each ingredient. This approach, of course, is different from the practice of using volume measures for the ingredients as is common in the United States. Consequently, a scale which is readily convertible to read in grams would find a market in many countries of the world where the European technique is practiced.

Along the same lines, surprising numbers of the cooking public have turned to organic and health foods and it has been found that the process by which foods are prepared with health reasons in mind most closely approximates chemical formulation. Therefore, the importance of a scale which is readily adaptable to weighing the components of a properly nutritious and chemically sound diet has been increased greatly. Consequently, the purpose of the invention disclosed herein is to solve these many culinary problems by means of a scale which is readily adaptable in an inexpensive, convenient and efficient manner to the task to be performed.

Another problem associated with scales which require special faces and calibrations thereon is in the area of postal scales. It is well known that postal rates are changed from time to time and any change in the postal rates necessitates a similar change in the readout face on postal scales since such scales are adapted to read directly in terms of the amount of postage required for a given piece of mail. When a change in postal rates occurs, the business community must have the new scales in service in a short period of time so they will correctly post their business correspondence and the recipients will not incur the expense of postage due charges.

This invention provides an inexpensive and convenient means by which the calibrated scale face may be interchanged without the need of special tools or skills. Although it is well known in the industry to have scale faces which are mechanically fastened with tools or adhesively fastened to some permanent backing, it has been found that these methods are inconvenient and inaccurate, respectively. That is to say, the former mechanically fastened scale faces require tools and special equipment not readily available in the home or office environment and the latter adhesively fastened scale faces are subject to incorrect placement, difficulty in removal and overall poor quality of appearance. The scale industry has learned from experience that the public is reluctant to change the scale face until long after it has become obsolete. This invention will overcome any difficulties or resistance which may have existed because of the need for special tools or skills to correct a scale face.

As can be appreciated from the foregoing, the versatility of such a scale requires that the weight receiving portion be easily adapted to the particular purpose. In this invention the connection between the weight receiving portion of the scale and the scale mechanism must be such that the effort needed to interchange from platforms to receptacles for the material or item to be weighed should be accomplished with a minimum of equipment and inconvenience. Therefore, a connection is provided which does not require tools to disconnect but is sufficiently secured to afford the requisite stability and yet allow for the convenient removal and change from one weight receptacle to another.

In the prior art there have been scales which include overlying calibrated readout faces which were constructed to be snapped onto the scale housing without need of further fasteners. Such a scale is shown in Homs U.S. Pat. No. 3,413,952. Similarly, it is well known from the U.S. Patent to Lamb No. 2,866,940 to provide a multitude of overlying calibrated readout faces to be used for a number of special purposes. None of the prior art, however, teaches the combination disclosed herein which provides a versatile scale which may be easily changed to suit a number of special purposes. The scale of the present invention can be modified without tools or special equipment in that the scale face is easily removed and the scale platform may be easily interchanged. Moreover, the scale face is made from a flat sheet of material, and, therefore, is easily and inexpensively reproduced and shipped to the users at no more expense than the cost of a letter. Consequently, the combination allows a very versatile scale adaptable to many purposes.

While scales are considered as a rather utilitarian device and are excepted to operate well and accurately for a number of years without repair or adjustment to the basic mechanism, it is worthwhile if the scale mechanism housing or casing is readily opened in order that the mechanism may be removed for internal cleaning, repair or adjustment. This invention provides a closed and relatively sealed housing which can be entered for an easily removable scale readout mounting which serves as the front of such a scale. Although the scale mechanism is relatively enclosed, it is arranged so that it may be easily fastened to its housing. In addition, the pointer indicator is arranged so that it may be easily attached to and detached from the weighing mechanism and thus facilitate the assembly and disassembly of the scale for ease of construction and maintenance.

SUMMARY OF THE INVENTION

In order to practice the invention, there is provided a basic structure of a cup-shaped housing with one open side and having a scale mechanism attached to an interior wall of the housing. The scale or weighing mechanism is of a conventional and well known type using the principle of Hook's Law in that the extension of a tension spring is the basic scale weight supporting element. To this spring are attached a series of links to which are connected a vertically disposed weight receiving arm and a pair of scale pointer supporting legs. The scale is designed so that a number of different weight receiving platforms, receptacles, etc. may be easily connected to the upper end of the weight receiving arm by means of an interference fit and so that a horizontally disposed scale calibration pointer indicator is releasably retained in keyed openings provided in its support legs. In order to accurately locate and support the calibrated readout face in front of the indicator, there is provided a frame-like mounting which has openings through which the outwardly extending ends of the indicator support legs pass. This mounting frame is arranged to fit snugly within the edge of the open side of the scale housing. Therefore, the scale is assembled by attaching the basic mechanism to an inner wall of the housing in a known manner, inserting the readout face mounting frame into the open face of the housing, attaching the pointer indicator to the keyed openings in its supporting legs and then engaging the resilient calibrated readout face into openings provided in the mounting frame by pinching the readout face so that it may be sprung into position. As a final step in the construction of this scale, the platform or weight receiving receptacle is engaged with the weight receiving arm of the scale mechanism. This arm passes upwardly through an opening in the cup-shaped housing provided for this purpose and the upper end of the arm has a shape which is compatible for mating with a recess provided in an abutment that is formed on the underside of the weight receiving platform or receptacle.

Accordingly, it is an object of the present invention to provide a compact scale which is readily assembled and disassembled for ease of fabrication and repair.

It is another object of the present invention to provide an improved scale readout face which can be easily removed and change to suit the application of the scale.

It is a further object of the present invention to provide an improved connection between the scale mechanism and the weight receiving platform or receptacle to facilitate the adaptation of the basic scale to a number of tasks.

It is a further object of the present invention to provide a supporting means for a scale indicator which requires no fasteners requiring tools or adhesive backed labels requiring extremely accurate alignment.

It is still another object of the present invention to provide a scale of this type which is relatively simple and economical to fabricate and which is reliable in operation and use.

An additional object of the present invention is to provide a versatile scale which may be easily converted to the task at hand without undue inconvenience or uncommon skills.

The further objects and advantages of the present invention will become apparent as the following description proceeds and the features of novelty which characterize this invention will be pointed out with particularity in the claims annexed to and forming a part of this specification.

DESCRIPTION OF THE DRAWINGS

FIG. 4 is an enlarged side elevational view of the zeroing mechanism and scale spring;

FIG. 5 is a front elevational view of the scale housing taken generally along line 5—5 of FIG. 2 and with the calibrated readout face removed;

FIG. 6 is an enlarged partial front elevational view illustrating the first step in the assembly of the weight indicator pointer to its supporting legs;

FIG. 7 is an enlarged partial front elevational view illustrating the second step in the assembly of the weight indicator pointer to its supporting legs;

FIG. 8 is an enlarged fragmentary vertical cross sectional view taken generally along line 8—8 of FIG. 5;

FIG. 9 is a bottom plan view of the scale platform taken along line 9—9 of FIG. 1;

FIG. 10 is a front elevational view of the flat calibrated readout face as viewed along line 10—10 of FIG. 2 prior to assembly of same to the scale;

FIG. 11 is a side elevational view of an alternate form of a weight receiving receptacle to be used in place of the platform shown in FIGS. 1 and 2;

FIG. 12 is a perspective view of the lower link of the scale mechanism looking toward its underside;

FIG. 13 is a perspective view of the upper link of the scale mechanism shown in its inverted position; and FIG. 14 is a perspective view of the weight receiving arm for the scale mechanism.

Figure 1:
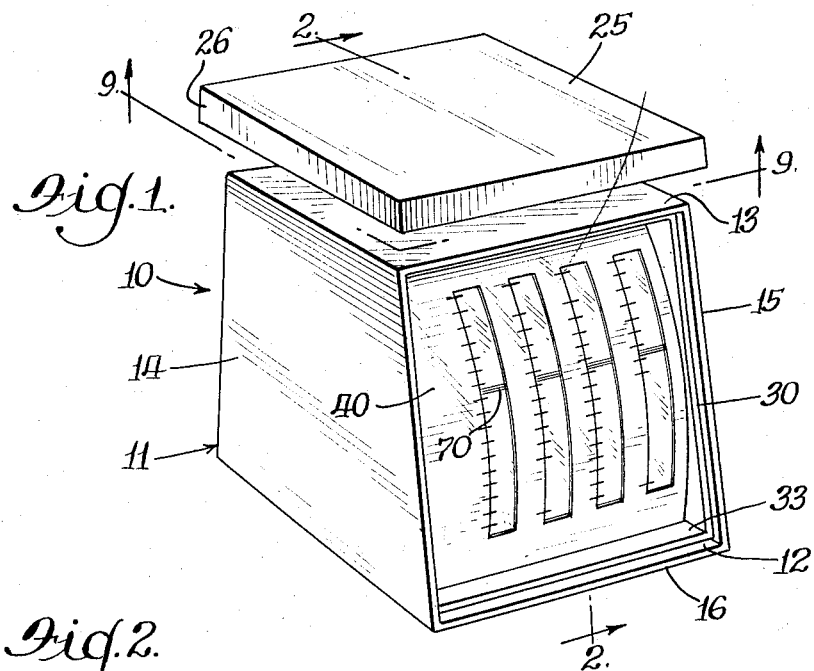
FIG. 1 is a perspective view of the versatile scale embodying the invention.
Figure 2:
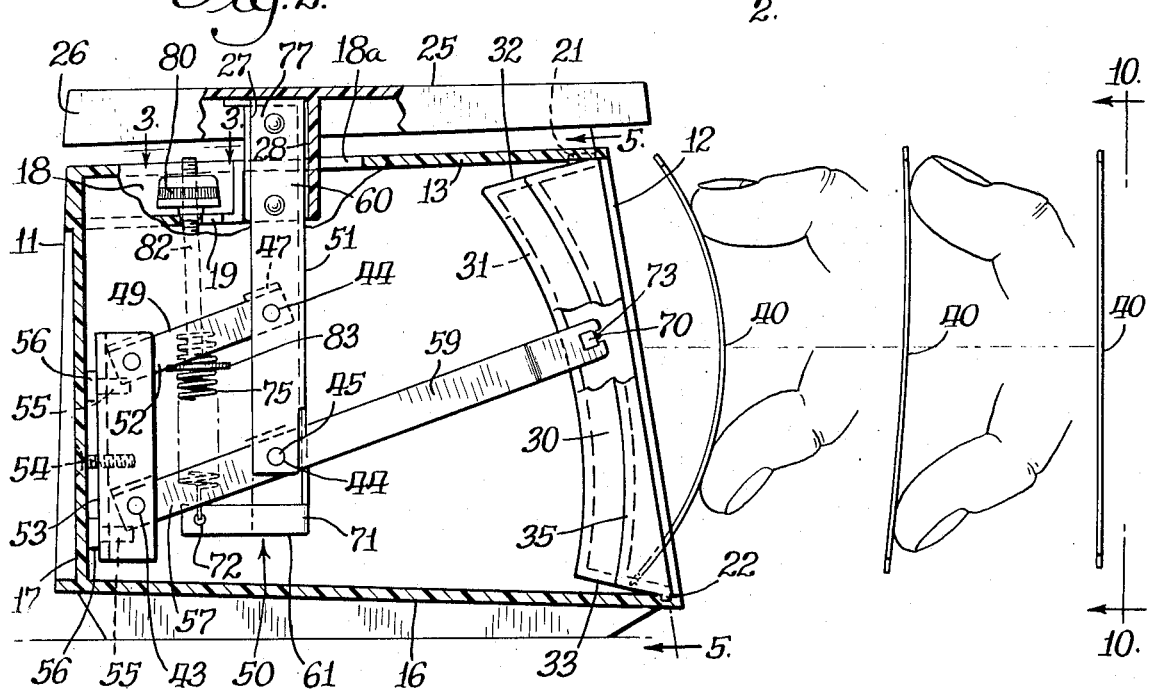
FIG. 2 is a fragmentary sectional view taken substantially along line 2—2 of FIG. 1 and illustrating the snap-in assembly of the scale face onto the scale face mounting frame.

Referring now to the drawings, there is shown in FIG. 1 a versatile scale designated generally by the reference numeral 10. The scale 10 has general proportions which are readily adaptable to a range of sizes which may be used for weighing large items found in the commercial or industrial environment or for weighing small light weight items found in the office or home such as mail to be posted. For this purpose, the scale 10 is formed of a number of basic components including a housing 11 of generally cup-shaped configuration having a forwardly facing open side 12. The cup-shaped housing 11 consists of a top wall 13, a pair of side walls 14 and 15, a bottom wall 16, and a rear wall 17, all of which are best shown in FIGS. 1 and 2. The scale is also provided with a basic known type scale mechanism 50 for supporting the weight receiving platform generally designated 25 and best shown in FIG. 2. The platform has a skirt 26 which surrounds the perimeter of the platform. As can best be seen in FIG. 1 there is a scale face mounting frame 30 positioned within the lip or edge formed at the mouth 12 of the open side of housing 11 where the side walls 14 and 15 meet top and bottom walls 13 and 16. This frame 30 is provided for locating, supporting, mounting, and generally shaping a calibrating scale readout face 40.

In order to more specifically describe the working components of the scale, reference is made to FIG. 2 where there is shown a cross sectional view of housing 11 wherein wall 14 has been removed in order to better illustrate the basic scale mechanism 50. As illustrated, the mechanism 50 includes a vertically disposed weight receiving arm 51, a pair of upper and lower movable supporting links 52 and 57 for supporting the weight receiving arm, the upper link 52 and the lower link 57 being supported at their rear ends on a pivot support 53 which is mounted on the inner surface of the rear wall 17 of the housing 11 by means of a flat headed self-tapping sheet metal screw 54 and a pair of support projections 55 molded as part of the interior surface of the rear wall 17 and projecting inwardly thereof. At the base of the projections 55 there is a boss or integral washer portion 56 provided to space the scale mechanism 50 a slight distance away from the inner surface of the rear wall 17. As can be seen best in FIGS. 12 and 13, the lower link 57 and the upper link 52 are of a general U-shaped configuration having a pair of spaced side legs connected to the bight portion of the U. As shown in FIGS. 2, 6 and 7, the lower link 57 is characterized by forwardly projecting extensions 58 and 59 of the side legs which are adapted to support an elongated horizontally disposed pointer or indicator 70 at their outermost ends. The upper link 52 also has a pair of side legs 49 through which there are provided four pivot holes 48. These side legs 49 are connected at their opposite ends by bight portions 47 of the U. The bight portions 47 serve to space apart the side legs 49 in order to give stability to the pivoting upper link 52. A similar construction is also used on lower link 57 wherein the bight portions are designated as 46. As best shown in FIG. 12 the location of the bight portions 46 with respect to the side legs 58 and 59 are near the rearward end of the lower link 57 and are spaced similar to that spacing of the bight portions 47 of upper link 52. Lower link 57 also has pivot holes 64 located in the rearward end of legs 58 and 59 and the holes 64 are adjacent the connection of the bight portions 47 and the legs 58 and 59 and are positioned with identical spacing to the spacing of the holes 48 in the upper link 52.

In order that the weight receiving arm 51 will movably cooperate with the links 57 and 52, the arm 51 is also of a U-shaped construction having a left side member 60 and a right side member 61 connected by a bight portion 62. The bight portion 62 of the weight receiving arm 51 is of an identical dimension to a bight portion 63 of the pivot support 53 both of which are just slightly wider than the distance between the sides of the upper link 57 and the lower link 52. In order to pivotally connect the upper link 52 and the lower link 57 to the sides 60 and 61 of the weight receiving arm 51, there are provided a pair of spaced holes 44 in each of the side members 60 and 61 of the arm 51. These holes 44 are spaced similar to complementary holes 43 provided on sides 42 of the U-shaped pivot support. It can thus be seen that when assembled to the pivot support 53 and the weight receiving arm 51, the upper link 52 and the lower link 57 will pivot in a parallel locus about the pivot support holes 43 because the spacing of the holes 43 on the pivot support 53 and the weight receiving arm 51 are identical. In order to form the parallel link supporting structure for the weight receiving arm 51, two pivot pins 45 are used to connect the upper link 51, the upper link 52 and the lower link 57 to the pivot support 53 and two more pivot pins 45 connect the weight receiving arm 51 to the links. The head end view of the pins 45 is shown in FIG. 2.

Immediately adjacent the holes 43 and 44 there are embossed recesses 41 so that there is accurate alignment with a minimum of friction area at the pivot points. Therefore, the upper and lower links 52 and 57 readily fit and are accurately positioned for parallel pivotal movement about the pivot support holes 43 and the weight receiving arm holes 44. Furthermore, the embossed recesses 41 near the pivot support holes 43 and the weight arm holes 44 cooperate with the pins 45 and the corresponding holes 48 in the upper link 52 and the pivot holes 64 in the lower link 57, respectively, causing the weight receiving arm 51 to move with very little friction in a substantially vertical direction through an opening 18a provided in the top wall 13 of the housing 11, while the outward end of extensions 58 and 59 of lower link 57 move in a broad arcuate path.

Figure 3:
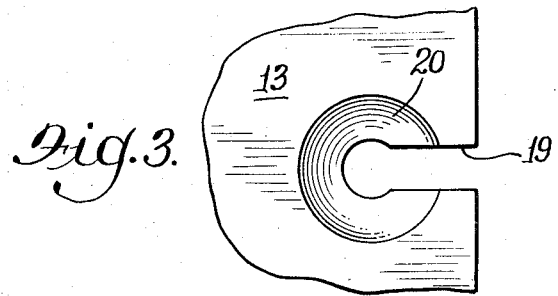
FIG. 3 is an enlarged fragmentary top plan view taken along line 3—3 of FIG. 2 with the control rod and adjusting nut deleted.

For the purpose of supporting the load to be weighed in a fashion such that the movement of the weight receiving arm will be proportional to the load supported, a vertically positioned tension coil spring 75 is connected to the weight receiving arm 51 at its lower end by means of a hook 76 formed out of half of the lowermost coil of the spring 75 and a bent tab 71 on weight receiving arm 51. The bent tab 71 includes a hole 72 for spring hook 76. At the upper end of the tension spring 75 there is an adjustable zeroing mechanism 80 connected to a support nut 81 which rides in a chamfered hole 20 located in a recessed portion 18 of the top wall 13 of the housing 11. This adjustable zeroing mechanism 80 is best shown in FIG. 4 and the chamfered hole 20 is also shown in FIG. 3. The chamfered hole 20 has an entry channel 19 for the opening 18a which facilitates the assembly of the zeroing mechanism 80 to the housing top wall 13 and the recess 18 therein. Between the support nut 81 and the tension spring 75 there is a threaded control rod 82 which at its upper end is threadedly received in the support nut 81 and at its lower end is connected to the spring 75 by means of a retaining washer 83. The retaining washer 83 is of a hat shape having a beveled and angular flange such that it may be threaded into the coils of the tension spring 75 and yet the washer opening through its center is still in perfect alignment with the axis of the coil spring 75. The bottom 85 of control rod 82 is upset to provide a surface which will not pass through the hole in the retaining washer 83 and in addition there is a stamped flat section 84 on the control rod 82 which, as will be seen from what follows, assists in the assembly of the zeroing mechanism 80 to the scale housing 11. The zeroing mechanism 80 may be assembled as a sub-assembly and then attached to the hole 72 in bent tab 71 before it is pivoted into position and the flat section 84 of the control rod 82 is slid through entry channel 19 to position support nut 81 in the chamfered hole 20. Once assembled, the flat section 84 is positioned below the channel 19 such that the control rod 82 is captured in the hole 20. Therefore, the tension on the support spring 75 may be readily varied by turning support nut 81. Since right hand threads are used, the spring tension may be increased by turning the support nut 81 clockwise from above and conversely the spring tension may be decreased by turning the support nut counterclockwise, also from above.

In addition to the previously mentioned assembly of the scale mechanism 50 to the cup-shaped housing 11 and the assembly of the zeroing mechanism 80 to the scale mechanism 50 and the housing 11 there are several further steps in the completion of the construction of the versatile scale disclosed herein. As shown in FIGS. 1, 2 and 5, and as previously mentioned, the mounting frame 30 is located in the open side or mouth 12 of the cup-shaped housing 11. In order to accurately position and firmly connect the mounting frame 30 to the inside lip of the open side 12, there are provided mounting lugs 21 and 22 on the top and bottom edges of the mounting frame 30. The inside edge of housing 11 on the open side 12 is provided with complementary recesses 23 and 24. Recesses 23 are located on the inside edge of top wall 13 so as to provide a locking opening for top lugs 21 whereas the bottom recess 24 is positioned in the center of the inside edge of bottom wall 16 of the housing 11 so as to cooperate with the lug 22. Therefore, the mounting frame 30 is securely snapped into the mouth 12 of housing 11 by the pair of top lugs 21 and the unitary bottom lug 22 in a manner such that frame 30 may only be mounted and locked in one position within the open side 12 of housing 11. The mounting frame 30 is of a rather intricate design having a shallow box-like construction with a convex rear wall 31 when viewed from the front of the scale. The rear wall 31 connects to a forwardly and upwardly inclined top wall 32 and a similarly forwardly and downwardly inclined bottom wall 33. Along each side of rear frame wall 31 are a pair of side walls 34 which are identical except that they are the mirror image of one another. As can best be seen in FIGS. 2 and 5, there is provided an inwardly projecting ridge or shelf 35 on each of the side walls 34. These shelves 35 are also convex, and, therefore, concentric to the surface of the rear wall 31. The calibrated scale readout face 40 is supported on these convexed surfaces 35 when in its mounted or assembled position.

As already discussed, the scale mechanism 50 and the zeroing mechanism 80 are readily fastened to the housing 11. From the foregoing, it is understandable that the mounting frame 30 may also be firmly snapped into the open side 12 of housing 11 in its required location due to the recesses and lugs provided for this purpose. In the convex rear wall 31 of the mounting frame 30 there are a pair of vertically extending slotted openings 29 through which the outwardly extending legs 58 and 59 of the lower link 57 may pass as shown in FIG. 2. These slotted openings 29 are vertically elongated in order to allow unrestrained vertical movement of extension legs 58 and 59 under the influence of various conditions of scale loading. As can be appreciated from FIGS. 2 and 5, the ends of legs 58 and 59 are used to support the pointer indicator 70. For this purpose there are keyed openings provided in the outwardmost ends of legs 58 and 59 for the mounting and location of the pointer indicator. In leg 58 there is an opening 65 and in leg 59 there is an opening 66. While opening 66 is a closed figure of a square shape, the opening 65 is similarly square but has an open slot 67 going to the outwardmost face of the leg 58. As is shown in the end view in FIG. 8, the pointer indicator has a generally square cross section. However, there is a ridge 73 located on the face of the pointer which is used as a pointing element. In order to facilitate the accurate use of the scale, this ridge 73 is hot stamped with an appropriate contrasting and easily noticed color. The ridge 73 also has another function in that it is a locating device which cooperates with slot 67 such that the pointer indicator 70 is accurately located at the center line of legs 58 and 59. Turning now to FIGS. 6 and 7 which show the assembly technique for the pointer indicator 70 to the legs 58 and 59, we can see that there are a set of left hand projections 68 and a set of right hand projections 69 toward the opposite ends of pointer indicator 70. FIG. 7 shows the first step in the assembly of the pointer indicator 70 to its support legs 58 and 59. The end of the pointer indicator 70 closest to projection 69 is inserted and slid into opening 65 in leg 58 until the projections 69 are brought to bear against leg 58 so as to force leg 58 to the right as shown in FIG. 7 whereupon the opposite end of pointer 70, that is the end closest to projection 68, may be raised so as to align that end of the pointer 70 with opening 66 in leg 59. The aligned pointer 70 is then pushed to the right position as best shown in FIG. 6. Due to the resiliency of legs 58 and 59 the force on the pointer to spring or push leg 58 to the right may be relaxed allowing the end of pointer 70 closest to projections 68 to seat in opening 66 of leg 59 so that the projections 68 rest against the side of leg 59 as best shown in FIG. 5. In order to remove the pointer indicator 70, the reverse procedure is employed.

In addition to the previously mentioned assembly of the scale mechanism 50 to the housing 11 and the zeroing mechanism 80 to the scale mechanism 50 and the housing 11 and further assembly of the mounting frame 30 to the housing 11 and the pointer indicator 70 to the scale mechanism 50 there is yet another easily performed step in the completion of the construction of the versatile scale disclosed herein and that is the mounting of the scale readout face 40 to the mounting frame 30. So that this may be accomplished without tools or other equipment, there are provided extending portions or tabs of the readout face 40 which cooperate with the recesses provided on the frame 30. To be more specific, on the top frame wall 32 and the bottom frame wall 33 there are included mounting openings 36 and 37a and 37b immediately adjacent to the connection of walls 32 and 33 to the top and bottom edge of the convex rear wall 31 of the mounting frame 30. The openings 36 are centered in the middle of top frame wall 32 and bottom frame wall 33 whereas the mounting openings 37a are located at the right on top frame wall 32 and bottom frame wall 33 and the openings 37b are located at the left on top frame wall 32 and bottom frame wall 33 when viewed as in FIG. 5. The calibrated readout face 40 as shown in FIG. 10 has located upon its top and bottom a pair of extending portions or tabs generally labeled 38 and 39a and 39b. Portions 38 are designed to cooperate with center mounting openings 36 of the mounting frame 30. Similarly, the extended portions 39a of the calibrated readout face 40 are designed to cooperate with mounting openings 37a of mounting frame 30 and extending portions 39b of the calibrated readout face 40 are arranged to mate with mounting openings 37b of mounting frame 30. Since there are extending portions 38, 39a and 39b on the resilient calibrated readout face 40, there is sufficient mounting support to make the face 40 accurately fit the counter of the convexed surfaces of shelves 35 notwithstanding the flexibility of the face 40. It can be readily appreciated that the extended portions of the readout face 40 are arranged so that the readout face may only be inserted and located in one position within the mounting frame 30.

In order to best illustrate the technique of inserting the readout face 40 to the mounting frame 30 we again refer to FIG. 2 and in particular the sketches shown to the right of the main cross sectional view wherein the various stages of bending the scale readout face 40 in order to insert it and its retaining extended portions 38, 39a and 39b into the mounting openings 36, 37a and 37b, respectively, of frame 30 are shown. As is illustrated, the user grasps the flat flexible readout face 40 and exerts a downward pressure with the upper digit and an upward pressure with the lower digit to cause extending portions 38, 39a and 39b to move inwardly somewhat in order to pass within the inside edges of top frame wall 32 and bottom frame wall 33 such that the extended face portions 38, 39a and 39b may then be engaged with their mounting openings 36, 37a and 37b, respectively. FIGS. 1 and 10 show the calibrated readout face for the scale. As can be seen there are a series of slots 40a which are either transparent or completely open which allow for the ridge 73 of the pointer indicator 70 to be aligned with a plurality of readout scales 40b. Consequently, a load being weighed can be read in various units of weight or when used in connection with postage may be weighed for various parcel post zones or different postage rates such as regular or air mail. The calibrated readout face can be made of a number of materials to facilitate the addition of scale designations thereon. For instance, the flat resilient material could be a piece of film calibrated by means of a photographic process, a piece of resilient paper or plastic calibrated by a printing process, a resilient piece of metal to which the calibrations are added by stamping process, or a piece of material suitable for having the calibrations added by etching or lithography.

To complete the study of the assembly and construction of this versatile scale, it should be noted that there is an improved means of attaching the weight receiving platform 25 of FIGS. 1 and 2, or alternatively, a receptacle 90 as shown in FIG. 11 to the weight receiving arm 51. The receptacle 90 is quite similar to the platform 25 at its bottom side in that it has a skirt portion and a C-shaped cavity 28 formed by walls normal to the bottom of the receptacle. Atop the platform portion, however, there is added a basket-like structure having similar front, rear and side walls generally labeled 91. Along the top edge of the receptacle 90 there is a reinforcing rim 92 which is added to provide the necessary strength for the open upwardly facing side of the receptacle 90. In the walls 91 of the receptacle 90 there are provided a series of openings 93. These openings 93 are provided to facilitate the observation of the quantity of material being weighed within the receptacle 90. However, the walls may also be solid as for weighing ingredients for cooking, baking, etc.

Referring now to FIG. 9 which shows the bottom view of platform 25 or receptacle 90 it can be seen that there is an abutment thereon which consists of three walls forming a cavity 28 to receive the upper end of weight receiving arm 51. The cavity 28 has a generally C-shape and is arranged to fit tightly against the sides 60 and 61 of the top stabilizing shelf 77 of the weight receiving arm 51. As can be seen in FIG. 2 the rearwardly extending portion of the shelf 77 is such that it passes through the open side of the C-shaped cavity 28 while at the top and bottom edges of the open side of the C cavity 28 there are extending areas 27 which overlap the rearwardly facing edge of sides 60 and 61. Therefore, the C-shaped cavity provides an all encompassing opening receiving the upper end of the weight receiving arm 51. In order to create a proper interference fit between the weight receiving arm 51 and the platform C-shaped cavity 28, there are provided embossed protuberances 78 in the side walls 60 and 61 and in the bight portion therebetween. These protuberances cause an interference fit between the inside of the C-shaped cavity and the upper portion of the weight receiving arm. It should be appreciated that the natural resiliency of the mating parts and the contact between the protuberances 78 on the weight receiving arm 51 and the inside of the walls of the C-shaped cavity 28 create the necessary interference fit to retain the platform on the arm 51. Because all of the loading on the platform 25 or the receptacle 90 is in a downward direction, the stabilizing shelf 77 takes most of the loading. It should be appreciated, however, that the extending portions 27 operate to overcome any moment caused by an off-center loading which are primarily toward the rear of the platform 25 or receptacle 90. It can be seen now that in order to engage the platform 25 or receptacle 90 with the weight receiving arm 51 it is necessary only to align the C-shaped cavity with the upper end of the weight receiving arm 51 and press the two together thus inserting the arm 51 until the shelf 77 seats against the bottom of the platform 25 or receptacle 90.

While there has been shown and described a single embodiment of the present invention, it will be apparent to those skilled in the art that various changes and modifications may be made without departing from the invention in its broader aspects and it is, therefore, contemplated in the appended claims to cover all such changes and modifications as fall within the true spirit and scope of the present invention.

What is claimed as new and desired to be secured by Letters Patent of the United States is:

1. A scale comprising a cup-shaped housing with an open side, a scale mechanism enclosed in said housing, a calibrated readout face covering said open side of said housing, a mounting member for said calibrated readout face, said mounting member being located within the lip of said open side of said housing, said calibrated readout face being located at the outer edge of said mounting member, an aperture in a wall of said housing for a weight receiving arm of said scale mechanism, a weight indicator connected to said arm and controlled by said scale mechanism, said weight indicator being located between said mounting member and said calibrated readout face and having portions adjacent to said calibrations and being visible through portions of said calibration readout face for indicating the proper weight reading.

2. The scale of claim 1 wherein said mounting member is provided with locating means, and said calibrated readout face is a flat piece of resilient material adapted to be resiliently engaged with said locating means for positioning and shaping said calibrated readout face in an arcuate manner so as to lie in front of the path of said weight indicator.

3. The scale of claim 2 wherein the calibrated readout device is a piece of film such that the calibration may be added to the readout face by a photographic process.

4. The scale of claim 2 wherein the calibrated readout face has elongated openings therethrough, the longer sides of which are normal to the calibrations thereon such that the weight indicator may align with said calibrations and be seen through said openings.

5. The scale of claim 4 wherein said calibrations are added to said readout face by means of a printing process.

6. The scale of claim 4 wherein said calibrations are added to said readout face by means of a stamping process.

7. The scale of claim 4 wherein said calibrations are added to said readout face by means of an etching process.

8. The scale of claim 4 wherein said calibrations are added to said readout face by means of a lithographic process.

9. The scale of claim 2 wherein said locating means are recesses for cooperative engagement with said calibrated readout face.

10. The scale of claim 9 wherein tabs are provided on said calibrated readout device for engagement with said recesses.

11. The scale of claim 10 wherein said calibrated readout face is arranged with tabs located for mating with corresponding recesses to assure that said readout device may only be mounted in one way.

12. A scale comprising a cup-shaped housing with an open side, a scale mechanism enclosed in said housing, a calibrated readout face for covering the open side of said cup-shaped housing, a mounting member for locating said calibrated readout face, an aperture in a wall of said housing for a weight receiving arm of said scale mechanism, a weight indicator connected to said weight receiving arm and controlled by said scale mechanism, said weight indicator having a pair of legs for supporting an indicator pointer, said indicator pointer being located adjacent said calibrated readout face for pointing to the appropriate calibrations.

13. The scale of claim 12 wherein said weight indicator legs are resilient and spaced apart from one another, openings provided in said mounting member through which said legs may pass, locating apertures in the outer ends of said pointer supporting legs for retaining said indicator pointer, said apertures being keyed to the shape of said indicator pointer such that said pointer may only be mounted in one position.

14. The scale of claim 13 wherein said indicating pointer is resiliently retained between the spaced legs of said weight indicator, said pointer having an outwardly facing upstanding ridge of thin cross section for use as a pointing and indicating element and two pairs of ears against which said resilient legs abut.

15. A scale comprising a cup-shaped housing with an open side, a scale mechanism disposed in said housing, said scale mechanism being mounted to an inside wall of said housing by a fastener and locating members, a calibrated readout face for covering said open side of said housing, a mounting member for said calibrated readout face, said mounting member being disposed adjacent the edge of said open side of said housing, an aperture in a wall of said housing for a weight receiving arm of said scale mechanism, a weight indicator connected to said arm and controlled by said scale mechanism, said weight indicator having outwardly extending portions which pass through openings in said mounting member in order to carry a pointer indicator for said calibrated readout face.

16. The scale of claim 15 wherein said open side is completely covered by said calibrated readout face and said mounting member supports said calibrated readout face in front of said pointer indicator, said mounting member acting as a backdrop for said calibrated readout face.

17. The scale of claim 16 wherein said weight receiving arm is of U-shaped cross section and mates with a weight receiving member of substantially greater size, said weight receiving member having a depending U-shaped abutment normal thereto which is shaped to fit tightly around said weight receiving arm, a horizontal appendage provided atop said weight receiving arm for stabilizing said weight receiving member, a plurality of bumps provided on the walls of said U-shaped weight receiving arm for assuring an interference fit between said weight receiving member abutment and said arm.

18. The scale of claim 17 wherein said calibrated readout face is resiliently sprung into receiving recesses provided in said mounting means in order that said readout may be inserted and removed without the use of tools.

19. A process for manufacturing a scale comprising the steps of forming a cup-shaped housing having an open front side; inserting a scale mechanism into said cup-shaped housing through the open side of said housing; fastening said scale mechanism to an interior wall of said scale housing; installing a mounting means for a calibrated readout face in the edge of said open side of said cup-shaped housing; attaching a weight receiving member to a weight receiving arm of said scale mechanism, said arm passing through an aperture in a wall of said cup-shaped housing; inserting and resiliently retaining a pointer indicator into a pair of legs provided on said scale mechanism, said pointer passing through openings in said mounting means; and snapping a resilient calibrated readout face into said mounting means.

* * * * *